(12) United States Patent
Salewski

(10) Patent No.: US 8,874,340 B2
(45) Date of Patent: Oct. 28, 2014

(54) METHOD FOR CONTROLLING AN AUTOMATED FRICTION CLUTCH

(71) Applicant: ZF Friedrichshafen AG, Friedrichshafen (DE)

(72) Inventor: Rene Salewski, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/061,826

(22) Filed: Oct. 24, 2013

(65) Prior Publication Data

US 2014/0136067 A1 May 15, 2014

(30) Foreign Application Priority Data

Nov. 9, 2012 (DE) .......................... 10 2012 220 496

(51) Int. Cl.
*G06F 7/00* (2006.01)
*B60W 10/02* (2006.01)
*F16D 48/06* (2006.01)

(52) U.S. Cl.
CPC ...................................... *F16D 48/06* (2013.01)
USPC ............................................ 701/68; 192/3.51

(58) Field of Classification Search
CPC .......... F16D 25/14; F16D 2500/50245; F16D 2500/50251; F16D 2500/50263; F16D 2500/50275
USPC .......... 701/58, 67, 68; 477/83, 166, 174–178, 477/180; 192/85.51, 109 F, 54.3, 3.51, 192/3.55–3.58
See application file for complete search history.

(56) References Cited

U.S. PATENT DOCUMENTS

| | | | |
|---|---|---|---|
| 4,434,879 A | 3/1984 | Lutz et al. | |
| 6,711,486 B1 * | 3/2004 | Karlsson et al. ................ | 701/67 |

(Continued)

FOREIGN PATENT DOCUMENTS

| | | |
|---|---|---|
| DE | 30 28 251 A1 | 3/1982 |
| DE | 692 07 474 T2 | 8/1996 |
| EP | 0 459 273 A1 | 12/1991 |
| EP | 0 512 690 A1 | 11/1992 |
| WO | WO 0117815 A1 * | 3/2001 |

OTHER PUBLICATIONS

Horst-W. Grollius: Grundlagen der Pneumatik. 2. Auflage. Munchen: Hanser Verlag, 2009. S. 47-48; S. 61-64; S. 92.—ISBN 978-3-446-41776-2, See German Search.

(Continued)

*Primary Examiner* — Mary Cheung
*Assistant Examiner* — Rodney Butler
(74) *Attorney, Agent, or Firm* — Davis & Bujold, PLLC; Michael J. Bujold

(57) ABSTRACT

A method of controlling an automated friction clutch arranged as a starting and shifting clutch in a vehicle between an engine driveshaft and an input shaft of a transmission. The clutch can be engaged passively by a contact pressure spring and disengaged and engaged by a pneumatic control cylinder. The air inlet and outlet valves are opened in a sustained-pulse operating mode, over a duration $\Delta t_V$ calculated as the quotient of air mass difference $\Delta m_K$ between the nominal mass $m_{K\_soll}$ present in the pressure chamber of the control cylinder when the control piston is in its nominal position $x_{K\_soll}$ and the actual air mass $m_{K\_ist}$ present when the control piston is in its actual position $x_{K\_ist}$ ($\Delta m_K = m_{K\_soll} - m_{K\_ist}$) and air mass flow $m_v$ passing through the control valve concerned, which depends on the existing pressure situation and the flow characteristics of the open inlet or air outlet valve ($\Delta t_V = \Delta m_K / m_v$).

8 Claims, 4 Drawing Sheets

(56) References Cited

U.S. PATENT DOCUMENTS

| 8,000,869 B2* | 8/2011 | Petzold et al. | 701/68 |
| 2009/0090591 A1* | 4/2009 | Petzold et al. | 192/54.3 |
| 2010/0113218 A1* | 5/2010 | Herter et al. | 477/83 |

OTHER PUBLICATIONS

German Search Report Corresponding to 10 2012 220 496.2 mailed Jun. 26, 2013.

* cited by examiner

METHOD FOR CONTROLLING AN AUTOMATED FRICTION CLUTCH

This application claims priority from German patent application serial no. 10 2012 220 496.2 filed Nov. 9, 2012.

FIELD OF THE INVENTION

The invention concerns a method for controlling an automated friction clutch arranged as a starting and shifting clutch in a motor vehicle between the driveshaft of a drive engine and the input shaft of a change-speed transmission.

BACKGROUND OF THE INVENTION

Certain motor vehicles, in particular heavy trucks and omnibuses, are usually equipped with a compressed-air brake system and sometimes also with an air suspension system. Thus, they have a supply system for the production, drying and storage of compressed air. When such a motor vehicle is equipped with an automated friction clutch, this is expediently also actuated by compresses air, i.e. engaged and disengaged by means of a pneumatic control cylinder, since the required energy source is already available in the motor vehicle.

DE 30 28 251 C2 describes a corresponding pneumatic actuating device for a friction clutch, which comprises an air inlet valve, an air outlet valve and a switching valve. The air inlet valve is in the form of a 2/2-way magnetic switching valve which, in its non-actuated rest condition is closed and which is opened to disengage the friction clutch. The air outlet valve is also in the form of a 2/2-way magnetic switching valve which, in its non-actuated rest condition, is closed and which is opened for the rapid engagement of the friction clutch, whereby a connection formed when the switching valve is in its non-actuated rest condition, vents the pressure chamber of the control cylinder, the air outlet valve and a throttle positioned downstream from the latter. The switching valve is in the form of a 3/2-way magnetic switching valve which, to set a particular torque of the friction clutch that acts when it is frictionally slipping while the air outlet valve is closed, is actuated cyclically whereby the pressure chamber of the control cylinder is vented via a throttle with a smaller cross-section connected downstream from the switching valve, so enabling relatively precise adjustment of the torque transmitted by the friction clutch.

Since magnetic switching valves are characterized by comparatively poor control dynamics, for the control of a friction clutch with which a defined disengagement position and hence a particular transmitted torque of a friction clutch is set in a regulating process by alternatively opening an air inlet valve or an air outlet valve, it is preferable to use pulsed valves, whose control dynamics are substantially better.

In an actuating device of this type the air inlet valve and the air outlet valve can be operated with pulse width modulation. In that method the effective opening level of each pulsed valve and therefore the control pressure in the pressure chamber of the control cylinder is adjusted by varying a time fraction (pulse width) within a constant cycle time. However, this control method has the disadvantage that, as experience shows, when the opening level is high undefined floating conditions of the magnet armature concerned can occur at the end of each time cycle, which impair the control dynamics and the ability of the valve to be regulated.

For that reason, in such an actuating device the air inlet and air outlet valves are preferably operated with pulse frequency modulation. In that method the effective opening level of each pulsed valve and hence the control pressure in the pressure chamber of the control cylinder is adjusted by varying the cycle time with a constant pulse width. In this case, at the end of each cycle time the magnet armature always reaches the end position that corresponds to the closed, rest condition, which results in increased control dynamics and improved regulation ability.

EP 0 459 273 A1 describes how a definite disengagement position of a pneumatically controlled friction clutch is set in a regulating process as a function of the difference between a specified nominal position and an actual position detected by sensor means, of the control piston of the control cylinder by alternative opening of the air inlet and the air outlet valves. The air inlet and air outlet valves are operated with pulse width modulation, the pulse width in each case being proportional to the difference between the nominal and actual positions of the control piston.

Finally, EP 0 512 690 B1 describes a pneumatic actuating device of a friction clutch, which comprises two air inlet valves arranged in parallel and two air outlet valves also arranged in parallel, each of them with a different opening cross-section. By actuating one or both air inlet or air outlet valves, it is thus possible to obtain different disengagement and engagement rates. Furthermore, by way of a hydraulic transmission device comprising an emitter cylinder, a pressure line and a receiver cylinder as well as a release lever, the control piston of the pneumatic control cylinder is in controlling connection with the contact pressure spring of the friction clutch. The stated objective of EP 0 512 690 B1 is to combine the pneumatic control cylinder, the emitter cylinder of the hydraulic transmission device and the air inlet and air outlet valves in a shared housing.

Particularly when starting off and also when stopping on an incline with the clutch slipping, a definite disengagement position and hence a definite transmitted torque of the friction clutch must be set as accurately and quickly as possible. It is true that this can be done by controlled actuation of air inlet and air outlet valves in the form of pulsed valves, since in a manner known perse, if pulse width modulation is used the pulse width, and if pulse frequency modulation is used the cycle time, are varied in proportion to the difference between the nominal and actual positions of the control piston or of a transmission element arranged between the control piston and the contact pressure spring of the friction clutch. It has been shown, however, that for this vary many regulation cycles are required and the air inlet and air outlet valves have to be actuated a correspondingly large number of times. Considered over the envisaged service life of the motor vehicle this can lead to premature wear of the air inlet and air outlet valves, which results in leakage-related problems of the actuating device and on the whole to impaired control characteristics of the friction clutch.

SUMMARY OF THE INVENTION

Accordingly, the purpose of the present invention is to indicate a method for controlling an automated friction clutch which has a pneumatic actuating device of the type mentioned at the start, which method enables quick and accurate control of the friction clutch with less wear of the air inlet and air outlet valves.

This objective is achieved by a method for controlling an automated friction clutch arranged as a starting and shifting clutch in a motor vehicle between the driveshaft of a drive engine and the input shaft of a change-speed transmission, which clutch can be closed passively by means of a contact pressure spring and which can be engaged and disengaged by means of a simply acting pneumatic control cylinder whose control piston is in controlling connection with the contact pressure spring, and whose pressure chamber can be connected via at least one controllable air inlet valve to a compressed air source and via at least one controllable air outlet valve to a compressed air sink, whereby a defined disengagement position of the friction clutch is set in a regulating process as a function of the difference between a specified nominal position $K_{K\_soll}$ and an actual position $x_{K\_ist}$, the latter determined by sensor means, of the control piston or of a transmission element arranged between the control piston and the contact pressure spring, by alternatively opening the air inlet valve or the air outlet valve. According to the invention, the method is characterized in that the air inlet valve and the air outlet valve are in each case opened in a sustained-pulse operating mode whose pulse duration $\Delta t_V$ is calculated as the quotient of the air mass difference $\Delta m_K$ between the nominal air mass $m_{K\_soll}$ in the nominal position $x_{K\_soll}$ of the control piston and the actual air mass $m_{K\_ist}$ in the actual position $x_{K\_ist}$ of the control piston, present in the pressure chamber of the control cylinder ($\Delta m_K = m_{K\_soll} - m_{K\_ist}$), and the air mass flow in, through the control valve concerned, which depends on the existing pressure situation and the flow properties of the open air inlet or air outlet valve ($\Delta t_V = \Delta m_K / m_v$).

Advantageous features and further developments of the method according to the invention are the object of the subordinate claims.

Thus, the invention tarts from an automated friction clutch know perse, which is arranged as a starting and shifting clutch in a motor vehicle between the driveshaft of a drive engine and the input shaft of a change-speed transmission. The said friction clutch can be closed passively by means of a contact pressure spring, and can be disengaged and engaged by means of a simply acting pneumatic control cylinder. The control piston of the pneumatic control cylinder is in controlling connection with the contact pressure spring, and the pressure chamber can be connected via at least one controllable air outlet valve to a compressed air sink.

To set a particular disengagement position and thus also a defined transmissible torque of the friction clutch, in a regulating process the air inlet valve and the air outlet valve are opened alternatively as a function of the difference between a specified nominal position $X_{K\_soll}$ and an actual position $x_{K\_ist}$, determined by sensor means, of the control piston or of a transmission element arranged between the control piston and the contact pressure spring. In contrast to the previously known methods in which, with the use of pulse width or pulse frequency modulation this process entails a relatively large number of regulation cycles and correspondingly numerous operating cycles of the said control valves, the method according to the invention provides that the process takes place by sustained-pulse operation of the control valves. This means that the air inlet valve and the air outlet valve are in each case opened to the maximum extent, whereby the nominal position of the control piston is reached more quickly and with fewer cycles. Accordingly, the control valves are now actuated less frequently and therefore have a longer service life.

The duration $\Delta t_V$ of the sustained-pulse actuation of the air inlet valve or air outlet valve in each case is determined by calculation as the quotient of the air mass difference $\Delta m_K$ between the nominal air mass $m_{K\_soll}$ present in the pressure chamber of the control cylinder when the control piston is in its nominal position $x_{K\_soll}$ and the actual air mass $m_{K\_ist}$ present herein when the control piston in its actual position $x_{K\_ist}$, in accordance with the equation $\Delta m_K = m_{K\_soll} - m_{K\_ist}$ and the air mass flow $m_v$ through the control valve concerned, which depends on the existing pressure situation and the flow properties of the open air inlet or air outlet valve. Thus, for the duration $\Delta t_V$ of the respective sustained-pulse operation of the air inlet or air outlet valve, the equation $\Delta t_V = \Delta m_K / m_v$ is used.

The method described requires no modifications of the actuating and control system of the friction clutch, but rather, it is stored as a control program in a clutch transmission control unit of the motor vehicle. Thus, the method according to the invention can also be used in motor vehicle types already in use, by virtue of a software update, providing that the said vehicles are equipped with appropriate actuating and control systems.

The air mass difference $\Delta m_K$ required for determining the duration $\Delta t_V$ of the respective sustained-pulse operation of the air inlet or air outlet valve is calculated from the nominal volume $V_{K\_soll}$ of the pressure chamber of the control cylinder when the control piston is in its nominal position $x_{K\_soll}$ and the actual volume $V_{K\_ist}$ thereof when the control piston is in its actual position $x_{K\_ist}$, using the relationship $m_K = \rho * V_K$ and the state equation for ideal gases ($p/\rho = R*T$), from the equation:

$$\Delta m_K = \frac{p_{K\_soll} * V_{K\_soll} - P_{K\_ist} * V_{K\_ist}}{R * T_K}$$

in which the terms used denote:

p pressure (generally) in [Pa]

$\rho$ density (generally) in [kg/m$^3$]

R specific gas constant for air in [J/(kg*K)]

T temperature (generally) in [K]

$T_K$ average temperature of the compressed air in the pressure chamber of the control cylinder $p_{K\_soll}$ control pressure in the chamber of the control cylinder when the control piston is in its nominal position $x_{K\_soll}$ in [Pa]

$p_{K\_ist}$ control pressure in the pressure chamber of the control cylinder when the control piston is in its actual position $x_{K\_ist}$, in [Pa].

The control valve to be opened is determined by the sign of the air mass difference $\Delta m_K$ determined. When the air mass difference $\Delta m_K$ is positive ($\Delta m_K > 0$), the air inlet valve is opened for the duration $\Delta t_V$. If the air mass difference determined is negative ($\Delta m_K < 0$), then the air outlet valve is opened for the duration $\Delta t_V$.

It is true that the actual pressure $p_{K\_ist}$ present in the pressure chamber of the control cylinder when the control piston is in its actual position $X_{K\_ist}$ could be determined by a pressure sensor. Also, the nominal pressure $p_{K\_soll}$ present in the pressure chamber of the control cylinder when the control piston is in its nominal position $x_{K\_soll}$ could be determined from a characteristic line determined in advance by means of a pressure sensor. However, to avoid an expensive and sometimes error-prone pressure sensor, the nominal control pressure $p_{K\_soll}$ present in the pressure chamber of the control cylinder when the control piston is in its nominal position $x_{K\_soll}$ and the actual control pressure $P_{K\_ist}$ in the pressure chamber of the control cylinder when the control piston is in its actual position $x_{K\_ist}$ are preferably calculated, respectively, as the quotient of the respective value of the spring characteristic $F_K(x_K)$ of the contact pressure spring, which is known per se and stored in the clutch control or transmission control unit, and also the known functional surface area $A_K$ of the control piston, using the respective equations:

$$p_{K\_soll} = \frac{F_K(x_{K\_soll})}{A_K} \text{ and } p_{K\_ist} = \frac{F_K(x_{K\_ist})}{A_K}.$$

It is also true that the nominal volume $V_{K\_soll}$ present in the pressure chamber of the control cylinder in the nominal position $x_{K\_soll}$ of the control piston and the actual volume $V_{K\_ist}$ present in the pressure chamber of the control cylinder in the actual position $x_{K\_ist}$ of the control piston could in each case be obtained from a stored characteristic line. However, since the set position $X_{K\_0}$ of the control piston when the friction clutch is closed varies depending on the wear condition and should be correspondingly adapted, the method according to the invention preferably provides that the nominal volume $V_{K\_soll}$ present in the pressure chamber of the control cylinder with the control piston in its nominal position $x_{K\_soll}$ and the actual volume $V_{K\_ist}$ present in the pressure chamber of the control cylinder when the control piston is in its actual position $x_{K\_ist}$ are calculated, in each case as current values, from the respective positions of the control piston ($x_{K\_soll}$; $x_{K\_ist}$), the functional surface area $A_K$ of the control piston and the volume at rest $V_{K\_0}$, i.e. the volume present in the pressure chamber of the control cylinder when the friction clutch is closed ($x_K = x_{K\_0}$) using the equations:

$$V_{K\_soll} = V_{K\_0} + A_K * |x_{K\_0} - x_{K\_soll}| \text{ and } V_{K\_ist} = V_{K\_0} + A_K * |x_{K\_0} - x_{K\_ist}|.$$

The air mass flow $m_V$ passing through an open air inlet valve is calculated in accordance with ISO 6358 from the equation:

$$m = C * p_V * \rho_0 * \sqrt{\frac{T_0}{T_K}}$$

for $0 \leq (p_K/p_V) \leq b$, and $$m_V = C * p_V * \rho_0 * \sqrt{\frac{T_0}{T_K}} * \sqrt{1 - \left(\frac{p_K/p_V - b}{1-b}\right)^2}$$

for $p_K/p_V > b$
in which the terms used denote:
C pneumatic admittance of the air inlet valve, in [m⁴ kg/s]
b critical pressure ratio of the air inlet valve
$p_V$ supply pressure ahead of the air inlet valve, in [Pa]
$p_K$ control pressure in the pressure chamber of the control cylinder, in [Pa]
$\rho_0$ air density in the standard condition according to ISO 6358, in [kg/m³]
$T_0$ air temperature in the standard condition according to ISO 6358, in [K],
wherein the pneumatic admittance C and the critical pressure ratio b can be determined experimentally in accordance with ISO 6358.

Similarly, the air mass flow $m_V$ passing through an open air outlet valve is calculated from the equations:

$$m_V = C * p_K * \rho_0 * \sqrt{\frac{T_0}{T_K}}$$

for $0 \leq (p_0/p_K) \leq b$, and $$m_V = C * p_K * \rho_0 * \sqrt{\frac{T_0}{T_K}} * \sqrt{1 - \left(\frac{p_0/p_K - b}{1-b}\right)^2}$$

for $p_0/p_K \geq b$,
in which the terms used denote:
C pneumatic admittance of the air outlet valve, in [m⁴ kg/s]
b critical pressure ratio of the air outlet valve
$p_0$ ambient pressure around the air outlet valve, in [Pa],
To make it possible to obtain different disengagement and engagement rates of the friction clutch, a plurality of air inlet and/or air outlet valves can be connected in parallel between the compressed air source and the pressure chamber of the control cylinder or between the pressure chamber of the control cylinder and the compressed air sink, respectively, and these can in each case be opened individually or in combination with one another.

If these air inlet and/or air outlet valves have opening cross-sections of equal size and more than one of them is open the total air mass flow my passing into or out of the pressure chamber of the control cylinder is preferably calculated as a value of the air mass flow $m_V$ determined for a single open control valve multiplied by the number $n_V$ of open control valves ($m_V' = n_V * m_V$).

On the other hand, if the said air inlet and/or outlet valves have opening cross-sections of different sizes and more than one of them is open, then the total air mass flow $m_V^*$ passing into or out of the pressure chamber of the control cylinder is calculated as the sum of the values of the air mass flows $m_{V\_i}$ determined individually for each of the open control valves ($m_V^* + \Sigma m_{V\_i}$; i=1, $n_V$).

In the context of the invention it is self-evident that the duration $\Delta t_V$ of the sustained-pulse operation of the air inlet or air outlet valve concerned is in this case calculated using the respective resultant air mass flow ($m_V'$; $m_V^*$) for each case, so that the equations $\Delta t_V = \Delta m_K / m_V'$ and $\Delta t_V = \Delta m_K / m_V^*$ apply.

BRIEF DESCRIPTION OF THE DRAWINGS

For the further clarification of the invention the description of a drawing with a number of example embodiments is attached. The drawings show.

DETAILED DESCRIPTION OF THE PREFERRED EMBODIMENTS

Figure 1:
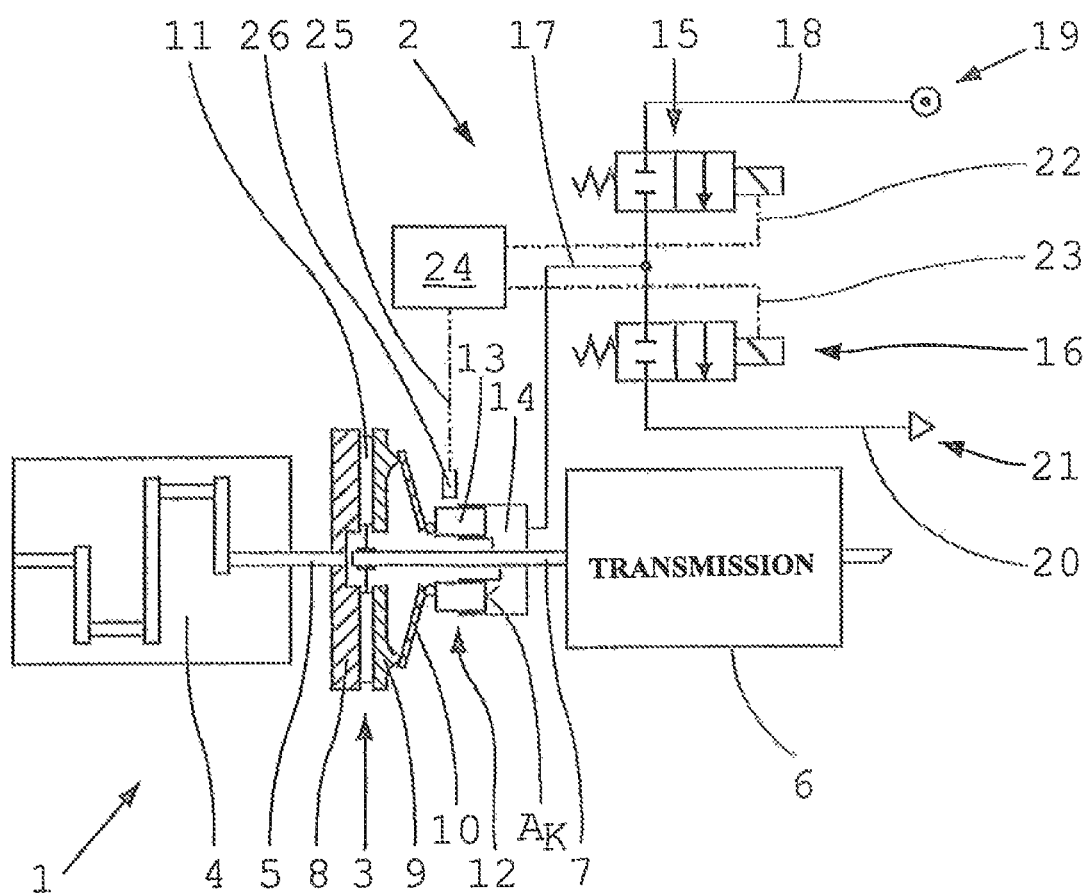
FIG. 1: A first embodiment of a control device of a friction clutch for implementing the method according to the invention.

FIG. 1 shows in schematic form part of a drive-train 1 of a motor vehicle and an electro-pneumatic control device 2 of a friction clutch 3 that can be actuated automatically.

The drive-train 1 comprises a drive engine 4 with a driveshaft 5, a change-speed transmission 6 with an input shaft 7, and the friction clutch 3 arranged as a starting and shifting clutch between the driveshaft 5 of the drive engine 4 and the input shaft 7 of the transmission 6. The friction clutch 3 is in the form of a passively closing, single-plate dry clutch fixed to a driven plate 8 of the drive engine 4, with a pressure plate 9, a contact pressure spring 10 and an entraining disk 11. The pressure plate 9 is mounted in a rotationally fixed manner but is able to more axially to a limited extent on the driven plate 8, and is pressed toward the driven plate 8 by the contact pressure spring 10 in this case in the form of a membrane spring. In this way the entraining disk 11 mounted rotationally fixed and axially movably on the input shaft 7 of the transmission 6 is clamped between the driven plate 8 and the pressure plate 9, whereby the friction clutch 3 is closed or engaged.

To disengage and engage the friction clutch 3 a simply acting pneumatic control cylinder 12 is provided, which has a control piston 13 whose position in the control cylinder 12 can be controlled by the control device 2. In this case the control cylinder 12 is designed as a so-termed central clutch (CSC) and is arranged coaxially over the input shaft 7 of the transmission 6. The control piston 13 of the control cylinder 12, which is in the form of a ring piston, is directly in controlling connection with the contact pressure spring 10 or, more accurately said, with the inner spring blades of the membrane spring, i.e. without any additional transmission element, by way of a release bearing which is only indicated in the figure. The inside walls of the control cylinder 12 and the inner, circular ring-shaped end surface $A_K$ of the control piston 13 delimit a pressure chamber 14 which can be pressurized, i.e. filled with compressed air, to disengage the friction clutch 3, or vented, i.e. emptied of compressed air, to engage the friction clutch 3.

For this purpose the control device 2 comprises an air inlet valve 15 and an air outlet valve 16. Each of these two control valves 15, 16 is in the form of a 2/2-way magnetic pulsed valve, which valves are closed in the non-actuated rest condition and open in the actuated condition, i.e. when energized. In the energized switching condition of the air inlet valve 15 the pressure chamber 14 of the control cylinder 12 is connected via a connection line 17 and a pressure line 18 to a compressed-air source 19 and is then pressurized, whereby the friction clutch 3 is disengaged. In the energized condition of the air outlet valve 16 the pressure chamber 14 of the control cylinder 12 is connected via the connection line 17 and an unpressurized line 20 to a compressed-air sink 21, for example to the ambient air, and is then vented whereby the friction clutch 3 is engaged under the action of the contact pressure spring 10. The control valves 15, 16 are connected via electric control lines 22, 23 to an electronic control unit 24 which is also connected by way of an electric signal line 25 to a position sensor 26, which is arranged in the area of the control cylinder 12 and which serves to detect the actual position $x_{K\_ist}$ of the control piston 13 and thus to determine the disengagement position of the friction clutch 3.

If now, starting from an arbitrary actual position $x_{K\_ist}$ of the control piston 13 a particular nominal position $X_{K\_soll}$ of the control piston is set in order to produce a defined transmitted torque of the friction clutch 3, the control method according to the invention provides that in a regulating process, the air inlet valve 15 and the air outlet valve 16 are opened alternatively each in a sustained-pulse operating mode, whose duration $\Delta t_V$ is calculated as the quotient of the air mass difference $\Delta m_K$ between the nominal air mass $m_{K\_soll}$ present in the pressure chamber 14 of the control cylinder 12 when the control piston is in the nominal position $x_{K\_soll}$ and the actual air mass $m_{K\_ist}$ present therein when the control piston is in its actual position $x_{K\_ist}$, i.e. ($\Delta m_K = m_{K\_soll} - m_{K\_ist}$), and the air mass flow $m_V$ through the control valve concerned (15 or 16), which depends on the existing pressure situation and on the flow characteristics of the open air inlet or air outlet valve (15 or 16), i.e. ($\Delta t_V = \Delta m_K / m_V$).

In this, the control valve 15 or 16 to be opened is determined by the sign of the air mass difference $\Delta m_K$ determined. If the air mass difference $\Delta m_K$ is positive ($\Delta m_K > 0$) the air inlet valve 15 is opened in the sustained-pulse mode for the duration $\Delta t_V$. If the air mass difference $\Delta m_K$ is negative ($\Delta m_K < 0$) the air outlet valve 16 is opened in the sustained-pulse mode for the duration $\Delta t_V$. By virtue of this sustained-pulse operation of the control valves 15, 16 the nominal position $x_{K\_soll}$ of the control piston 13 is reached more quickly than with the previously known control methods. The control valves 15, 16 are therefore actuated less often and so have a longer service life.

Figure 2:
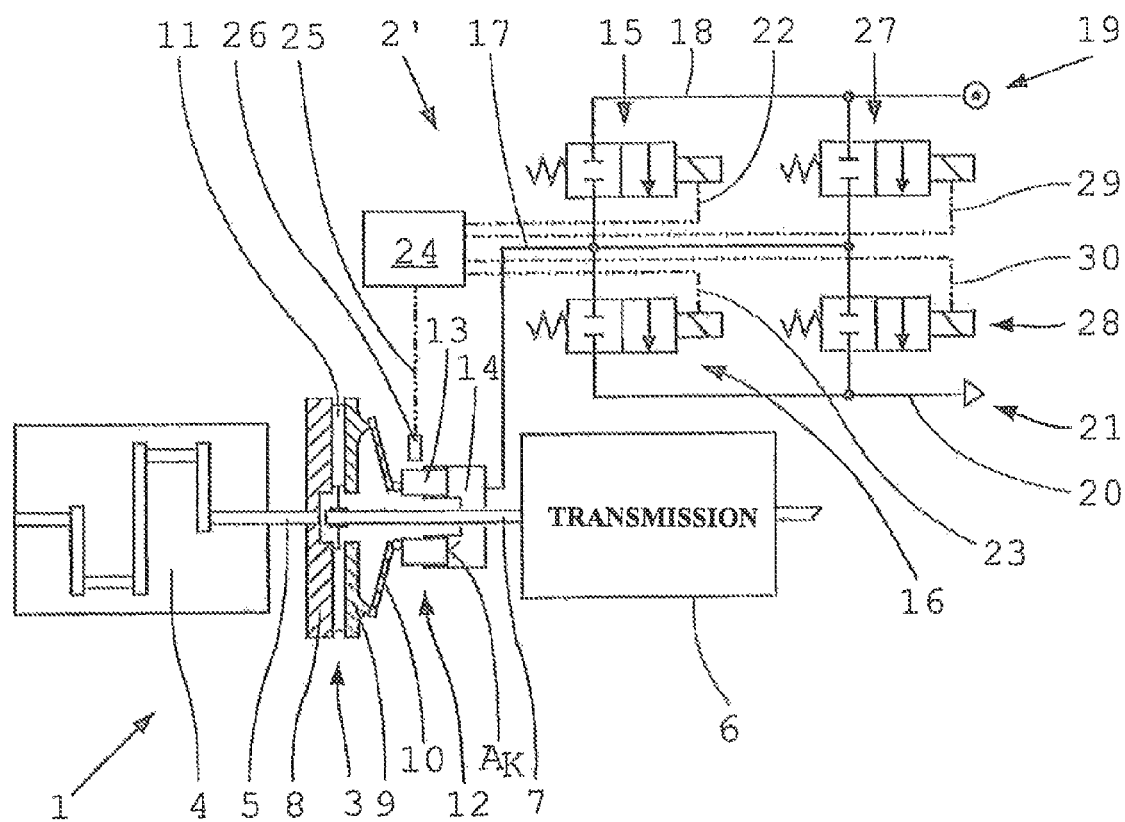
FIG. 2: A second embodiment of a control device of a friction clutch for implementing the method according to the invention.

With the same structure of the drive-train 1, the control device 2' shown in FIG. 2 differs from the control device 2 previously shown in FIG. 1, in that now a second air inlet valve 27 and a second air outlet valve 28 are present, respectively connected to the control unit 24 by an associated electric control line 29, 30 in each case. The second air inlet valve 27 is arranged in parallel with the first air inlet valve 15 between the pressure line 18 and the connection line 17, and has the same opening cross-section as the first air inlet valve 15. The second air outlet valve 28 is arranged in parallel with the first air outlet valve 16 between the connection line 17 and the unpressurized line 20, and has the same opening cross-section as the first air outlet valve 16.

By simultaneously opening the two air inlet valves 15, 27 or the two air outlet valves 16, 28, the friction clutch 3 can if desired be disengaged or engaged more quickly. To determine the duration $\Delta t_V$ of the sustained-pulse operation of the two air inlet valves 15, 27 or the two air outlet valves 16, 28, in this case the total air mass flow $m_V'$ passing into or out of the pressure chamber of the control cylinder must be used, and this can be calculated as the value of the air mass flow m determined for a single open control valve (for example 15 or 16) multiplied by the number $n_V$ (in this case $n_V = 2$) of open control valves (15, 27 or 16, 28) ($m_V'/n_V * m_V = 2 * m_V$).

Figure 3:
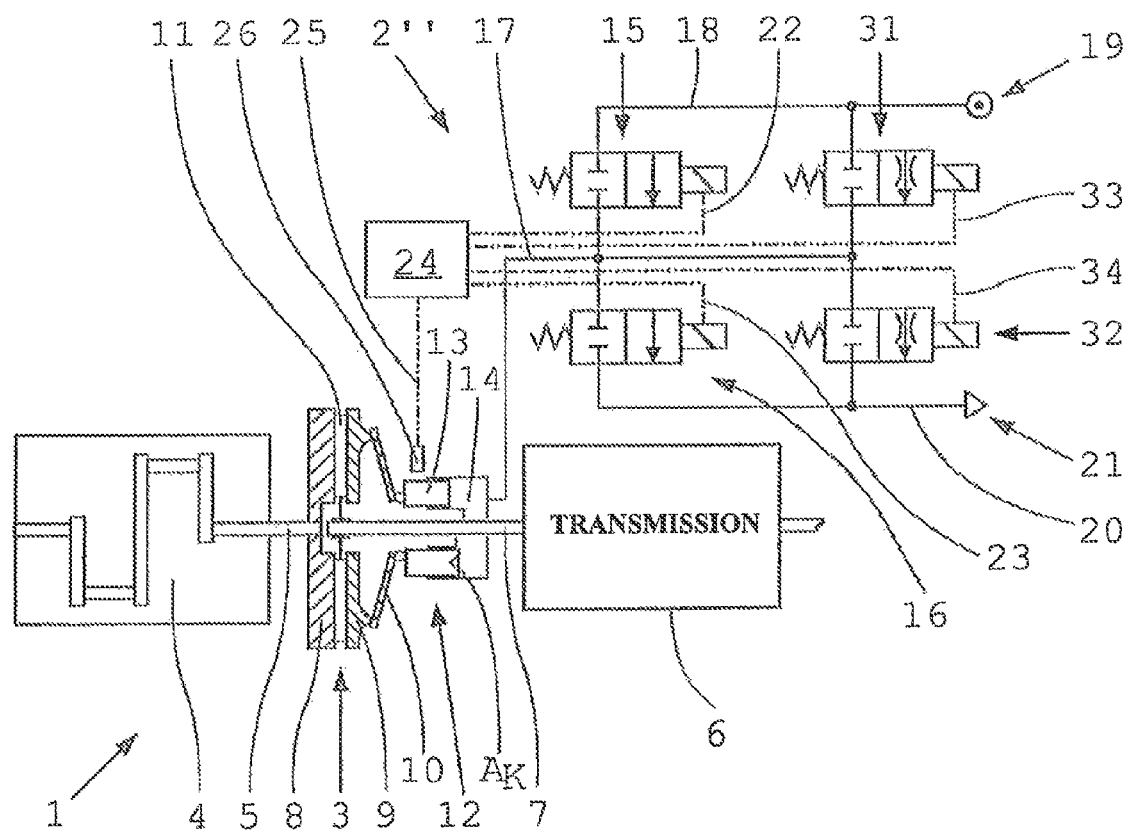
FIG. 3: A third embodiment of a control device of a friction clutch for implementing the method according to the invention.

With the same structure of the drive-train 1, the control device 2" shown in FIG. 3 differs from the control device 2' previously shown in FIG. 2, in that now the second air inlet valve 31 has a smaller opening cross-section than the first air inlet valve 15 and the second air outlet valve 32 has a smaller opening cross-section than the first air outlet valve 16. The second air inlet valve 31 and the second air outlet valve 32 are connected to the control unit 24 by respectively associated electric control lines 33, 34.

Thus, by opening only the second air inlet valve 31 the friction clutch 3 can be disengaged slowly, by opening only the first air inlet valve 15 at a medium control rate, and by opening both air inlet valves 15, 31 simultaneously it can be disengaged at a rapid rate. Likewise, by opening only the second air outlet valve 32 the friction clutch 3 can now be engaged slowly, by opening only the first air outlet valve 16 at a medium control rate, and by opening both air outlet valves 16, 32 simultaneously it can be engaged at a rapid rate.

When only one of these control valves (15 or 31, or 16 or 32) is opened, then to determine the respective duration $\Delta t_V$ of the sustained-pulse operation the air mass flow $m_V$ for the control valve concerned (15 or 31, or 16 or 32) is determined. However, when both control valves (15, 31 or 16, 32) are opened, then to determine the respective duration $\Delta t_V$ of the sustained-pulse operation of the two air inlet valves 15, 31 or of the two air outlet valves 16, 32 the total air mass flow $m_V^*$ passing into our out of the pressure chamber of the control cylinder is used, which can be calculated as the sum of the values of the air mass flows $m_{V\_i}$ determined individually for each of the open control valves (15, 31 or 16, 32), i.e. ($m_V^* = \Sigma m_{V\_i}$; $i=1, n_V$).

Figure 4:
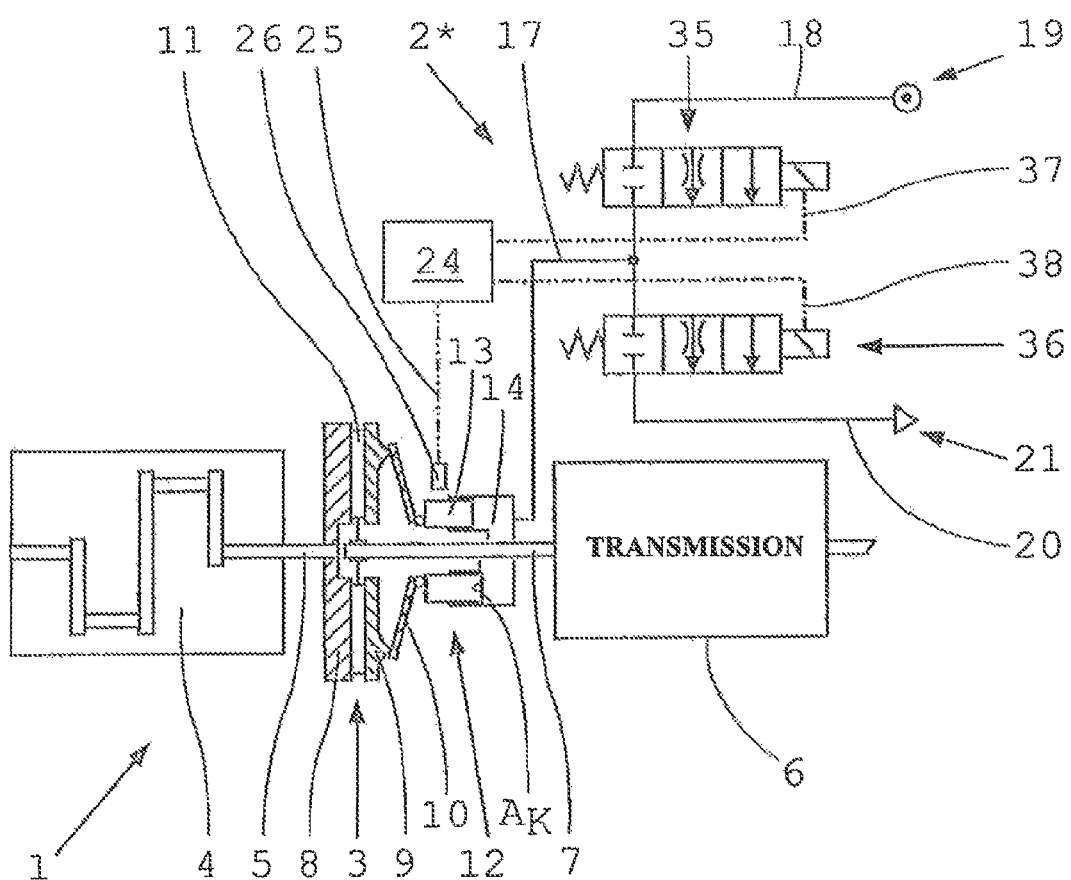
FIG. 4: A fourth embodiment of a control device of a friction clutch for implementing the method according to the invention.

With the same structure of the drive-train 1, the control device 2* shown in FIG. 4 differs from the control device 2" previously shown in FIG. 3, in that instead of the two air inlet valves 15, 31 made as pulsed valves, one air inlet valve 35 in the form of a ⅔-way magnetic switching valve is provided, and instead of two air outlet valves 16, 32 made as pulsed valves, one air outlet valve 36 in the form of a ⅔-way magnetic switching valve is provided. The said air inlet valve 35 and air outlet valve 36 are connected by respective associated electric control leads 37, 38 to the control unit 24. The air inlet valve 35 is closed in its rest position, open with a small opening cross-section in a first, central switched position and open with a large opening cross-section in a second, extreme switched position. Likewise, the air outlet valve 36 is closed in its rest position, open with a small opening cross-section in a first, central switched position and open with a large opening cross-section in a second, extreme switched position. Thus, by switching one of the two control valves (35 or 36) to one of the two switched positions the friction clutch can optionally be disengaged or engaged slowly or quickly.

Even though with less effective control dynamics, a particular nominal position $x_{K\_soll}$ of the control piston 13 can be set analogously by actuating the valves as described previously for the pulsed valves (15, 16; 27, 28; 31, 32), in that the air inlet valve 35 and the air outlet valve 36 are opened in a regulating process to one of their two switched positions. To determine the opening duration $\Delta t_V$ of the control valve (35 or 36) concerned, the air mass flow $m_V$ for the opening cross-section of the control valve concerned (35 or 36) in the switched position chosen is then determined.

INDEXES

1 Drive-train
2, 2', 2" Control device
2* Control device
3 Friction clutch
4 Drive engine
5 Driveshaft
6 Change-speed transmission
7 Input shaft
8 Flywheel
9 Pressure plate
10 Contact pressure spring, membrane spring
11 Entraining disk
12 Control cylinder
13 Control piston
14 Pressure chamber
15 First air inlet valve
16 First air outlet valve
17 Connection line
18 Pressure line
19 Compressed-air source
20 Unpressurized line
21 Compressed-air sink
22 Control lead
23 Control lead
24 Control unit
25 Signal lead
26 Position sensor
27 Second air inlet valve
28 Second air outlet valve
29 Control lead
30 Control lead
31 Second air inlet valve
32 Second air outlet valve
33 Control lead
34 Control lead
35 Air inlet valve
36 Air outlet valve
37 Control lead
38 Control lead
$A_K$ Functional surface of the control piston
b Critical pressure ratio
C Pneumatic admittance value
$F_K$ Spring force of the contact pressure spring
i Index, order number
$m_K$ Air mass in the pressure chamber
$m_{K\_ist}$ Actual air mass in the pressure chamber
$m_{K\_soll}$ Nominal air mass in the pressure chamber
$m_V$ Air mass flow
$m_{V\_i}$ Air mass flow through the i-th control valve
$m_V'$ Resultant air mass flow
$m_V^*$ Resultant air mass flow
$n_V$ Number of open control valves
p Air pressure
$p_0$ Ambient air pressure
$p_{K\_ist}$ Actual control pressure in the pressure chamber
$p_{K\_soll}$ Nominal air pressure in the pressure chamber
$p_V$ Supply pressure
R Specific gas constant
T Air temperature
$T_0$ Air temperature in the standard state
$T_K$ Average air temperature in the pressure chamber
$V_K$ Volume of the pressure chamber
$V_{K\_0}$ Rest volume of the pressure chamber
$V_{K\_ist}$ Actual volume of the pressure chamber
$V_{K\_soll}$ Nominal volume of the pressure chamber
$x_K$ Disengagement path, control path variable
$x_{K\_0}$ Rest position of the control piston
$x_{K\_ist}$ Actual position of the control piston
$x_{K\_soll}$ Nominal position of the control piston
$\Delta m_K$ Air mass difference
$\Delta t_V$ Duration of the sustained-pulse operation, opening duration
$\rho$ Air density in the pressure chamber
$\rho_0$ Air density in the standard state

The invention claimed is:

1. A method of controlling an automated friction clutch, which is arranged as a starting and shifting clutch in a motor vehicle between a driveshaft (5) of a drive engine (4) and an input shaft (7) of a change-speed transmission (6), the friction clutch is passively engagable by a contact pressure spring (10) and which is disengagable and engagable by a simply acting pneumatic control cylinder (12), a control piston (13) of the control cylinder is in controlling connection with the contact pressure spring (10) and has a pressure chamber (14) that is connectable, via at least one controllable air inlet valve (15), to a compressed-air source (19), and, via at least one controllable air outlet valve (16), to a compressed-air sink (21), the method comprising the steps of:

setting, via the contact pressure spring, a particular disengagement position of the friction clutch (3) in a regulating process as a function of a difference between a specified nominal position ($x_{K\_soll}$) and an actual position ($x_{K\_ist}$), determined by sensors, of either the control piston (13), or a transmission element arranged between the control piston (13) and the contact pressure spring (10), by alternatively opening the air inlet valve (15) and the air outlet valve (16), the air inlet valve (15) and the air outlet valve (16) are, in each case, opened in a sustained-pulse operating mode having a duration ($\Delta t_V$) that is calculated as a quotient of an air mass difference ($\Delta m_K$) between a nominal air mass ($m_{K\_soll}$) present in the pressure chamber (14) of the control cylinder (12) when the control piston (13) is in the nominal position ($x_{K\_soll}$) and the actual air mass ($m_{K\_ist}$) present therein when the control piston (13) is in the actual position ($x_{K\_ist}$) ($\Delta m_K = m_{K\_soll} - m_{K\_ist}$) and an air mass flow ($m_v$) passing through the inlet and the outlet valve (15; 16) concerned, which depends on an existing pressure situation and on flow characteristics of the open air inlet valve or the air outlet valve (15, 16) ($\Delta t_V = \Delta m_K / m_V$).

2. The method according to claim 1, further comprising the step of calculating, via a control unit, the air mass difference ($\Delta m_K$) from the nominal volume ($V_{K\_soll}$) of the pressure chamber (14) of the control cylinder (12) when the control piston (13) is in the nominal position ($x_{K\_soll}$) and the actual volume ($V_{K\_ist}$) thereof when the control piston (13) is in the actual position ($x_{K\_ist}$), using a relationship $m_K = \rho \cdot V_K$ and a state equation for ideal gases ($p/\rho = R \cdot T$), with the equation:

$$\Delta mK = \frac{p_{K\_soll} * V_{K\_soll} - p_{K\_ist} * V_{K\_ist}}{R * T_K}$$

in which:

$V_{K\_ist}$ is actual volume, $V_{K\_soll}$ is nominal volume, $m_K$ is air mass, p is pressure (generally) in [Pa], $\rho$ is density (generally) in [kg/m³], R is specific gas constant for air in [J/(kg*K)], T is temperature (generally) in [K], $T_K$ is average temperature of the compressed air in the pressure chamber (14) of the control cylinder (12), $P_{K\_soll}$ is control pressure in the pressure chamber (14) of the control cylinder (12) when the control piston (13) is in the nominal position ($x_{K\_soll}$) in [Pa], and $p_{K\_ist}$ is control pressure in the pressure chamber (14) of the control cylinder (12) when the control piston (13) is in the actual position ($x_{K\_ist}$) in [Pa].

3. The method according to claim 1, further comprising the step of calculating, with a control unit, the air mass flow $m_v$ passing through an open air inlet valve (e.g., 15) from the equations:

$$m_v = C * p_V * \rho_0 * \sqrt{\frac{T_0}{T_K}}$$

for $0 \leq (p_K/p_v) \leq b$, and $$m_v = C * p_V * \rho_0 * \sqrt{\frac{T_0}{T_K}} * \sqrt{1 - \left(\frac{p_K/p_v - b}{1-b}\right)^2}$$

for $p_K/p_v > b$ in which:

C is pneumatic admittance of the air inlet valve (15) in [m4 kg/s], b is critical pressure ratio of the air inlet valve (1), $p_V$ is supply pressure ahead of the air inlet valve (15) in [Pa], $p_K$ is control pressure in the pressure chamber (14) of the control cylinder (12) in [Pa], $\rho_0$ is air density in the standard condition according to ISO 6358 in [kg/m³], and $T_0$ is air temperature in the standard condition according to ISO 6358 in [K].

4. The method according to claim 1, further comprising the step of calculating, with a control unit, air mass flow $m_v$ passing through an open air outlet valve (e.g. 16) from the equations:

$$m_v = C * p_K * \rho_0 * \sqrt{\frac{T_0}{T_K}}$$

for $0 \leq (p_0/p_K) \leq b$, and $$m_v = C * p_K * \rho_0 * \sqrt{\frac{T_0}{T_K}} * \sqrt{1 - \left(\frac{p_0/p_K - b}{1-b}\right)^2}$$

for $p_0/p_K > b$, in which:

C is pneumatic admittance of the air outlet valve (16) in [m4 kg/s], b is critical pressure ratio of the air outlet valve (16), and $p_0$ is ambient pressure around the air outlet valve (16) in [Pa].

5. The method according to claim 2, further comprising the step of calculating, with the control unit, the nominal control pressure ($p_{K\_soll}$) present in the pressure chamber (14) of the control cylinder (12) when the control piston (13) is in the nominal position ($x_{K\_soll}$) and the actual control pressure ($p_{K\_ist}$) in the pressure chamber (14) of the control cylinder (12) when the control piston (13) is in the actual position ($x_{K\_ist}$); respectively, as a quotient of the respective value of the spring characteristic ($F_K(x_K)$) of the contact pressure spring (10), and the functional surface area ($A_K$) of the control piston (13) using the equation:

$$\left(p_{K\_soll} = \frac{F_K(x_{K\_soll})}{A_K} \; ; \; p_{K\_ist} = \frac{FK(x_{K\_ist})}{A_K}\right).$$

6. The method according to claim 2, calculating, with the control unit, the nominal volume $V_{K\_soll}$ present in the pressure chamber (14) of the control cylinder (12) when the control piston (13) is in the nominal position $X_{K\_soll}$ and the actual volume $V_{K\_ist}$ present in the pressure chamber (14) of the control cylinder (12) when the control piston (13) is in the actual position $x_{K\_ist}$, from the respective positions of the control piston ($x_{K\_soll}$; $X_{K\_ist}$), the functional surface area $A_K$ of the control piston (13) and the volume at rest $V_{K\_0}$ being defined as the volume present in the pressure chamber (14) of the control cylinder (12) when the friction clutch is engaged ($x_K = x_{K\_0}$), using the equations:

$$V_{K\_soll} = V_{K\_0} + A_K * |x_{K\_0} - X_{K\_soll}|, \text{ and}$$

$$V_{K\_ist} = V_{K\_0} + A_K * |x_{K\_0} - x_{K\_ist}|.$$

7. The method according to claim 3, further comprising the step of calculating, with the control unit, when more than one air inlet or air outlet valves arranged in parallel and having opening cross-sections of a same size (15, 27 or 16, 28) are open, the total air mass flow $m_v'$ passing into or out of the pressure chamber (14) of the control cylinder (12) as a value of the air mass flow my determined for a single open control valve (e.g., 15 or 16) multiplied by the number $n_V$ of open control valves (15, 27 or 16, 28), using the equation of:

$$m_v' = n_V * m_v.$$

8. The method according to claim 3, further comprising the step of calculating, with the control unit, when more than one air inlet or air outlet valves arranged in parallel and having opening cross-sections of different sizes (15, 31 or 16, 32) are open, the total air mass flow $m_v^*$ passing into or out of the pressure chamber (14) of the control cylinder (12), as the sum of the values of the air mass flows $m_{V\_j}$ determined individually for each of the open control valves (15, 31 or 16, 32) using the equation of:

$$(m_v^* = \Sigma m_{V\_j}; i \div n_V).$$

* * * * *